F. RADCLIFFE.
EYEGLASS TEMPLE HOLDER.
APPLICATION FILED OCT. 6, 1921.

1,418,170.
Patented May 30, 1922.

Inventor
Fred Radcliffe,

By
Attorney

UNITED STATES PATENT OFFICE.

FRED RADCLIFFE, OF PHILADELPHIA, PENNSYLVANIA.

EYEGLASS TEMPLE HOLDER.

1,418,170. Specification of Letters Patent. Patented May 30, 1922.

Application filed October 6, 1921. Serial No. 505,781.

*To all whom it may concern:*

Be it known that FRED RADCLIFFE, a citizen of the United States of America, residing at Philadelphia, in the county of Philadelphia and State of Pennsylvania, has invented new and useful Improvements in Eyeglass Temple Holders, of which the following is a specification.

The object of the invention is to provide a simple and efficient device for attachment to spectacle frames whereby the temple may be held in a fixed relation to the plane of the lenses to permit of one handed application of the glasses to the wearer; and with this object in view the invention consists in a construction and combination of parts of which a preferred embodiment is shown in the accompanying drawings, wherein:—

Figure 1:
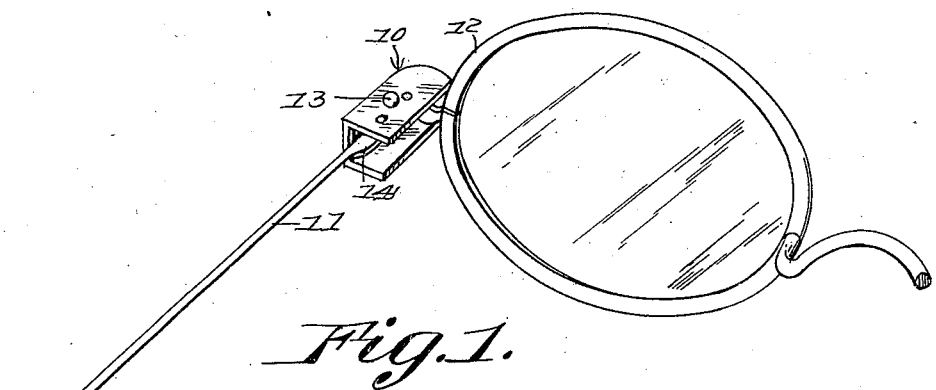
Figure 1 is a view of a device embodying the invention applied in the operative position to a spectacle frame.
Figure 2:
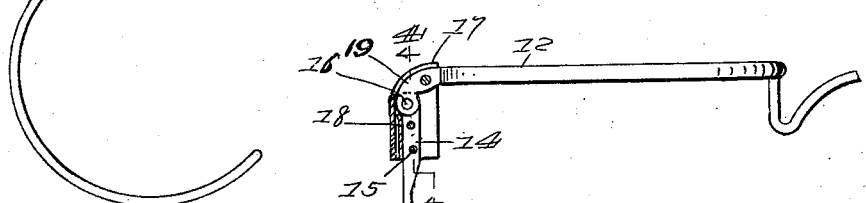
Figure 2 is a plan view of the same showing the attachment in section.
Figure 3:
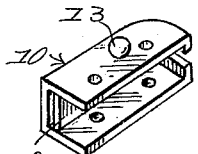
Figure 3 is a detail in perspective of the attachment.
Figure 4:
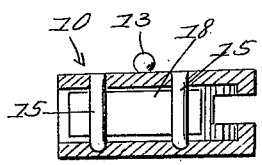
Figure 4 is a sectional view on the plane indicated by the line 4—4 of Figure 2.

The device consists of a clip 10 of box like form adapted to receive the joint between the temple 11 and the lens frame 12 of spectacles of the ordinary type to serve as a means of reinforcing the joint so as to prevent the outward displacement or deflection of the temple, and also to hold the temple against pivotal movement and in a position perpendicular to the plane of the lens frames, so that the clip may be grasped in one hand and the spectacles adjusted to the wearer without inconvenience incident under ordinary circumstances to this operation and particularly when the joints between the temples and the frame become loose.

The clip preferably carries a knob 13 as a means of facilitating the grasping thereof and in the construction shown the attachment of the clip is effected by means of pins 14 carried thereby in position to engage openings in the flattened or enlarged portion of the temple as shown at 15 adjacent to the hinge joint 16. The end of the clip is slotted as shown at 17, and extended between the outer side of the temple and the adjacent wall of the clip is a spring plate 18 which by terminal contact with the knuckle 19 forming an extension of the lens frame 12 serves to hold the temple in the extended position.

Thus while the temple may be folded into a position into substantial parallelism with the lens frame to be stored in a spectacle case or like receptacle, they are locked by the action of the springs in the extended position when moved thereto, so that in applying the spectacles to the face the temples are held in proper position even though the mounting or joint between the same and the lens frame has become somewhat loose by wear.

Having described the invention, what is claimed as new and useful is:—

1. A joint clip for spectacles having a means for attachment to the temple, and a spring carried by said clip for yieldingly holding the temple in a position perpendicular to the lens frame, the clip having parallel leaves arranged at opposite sides of the plane of the temple and knuckle and being slotted longitudinally adjacent to the latter.

2. A joint clip for spectacles having means for attachment to the temple and consisting of parallel leaves arranged at opposite sides of the plane of the temple, and a spring plate secured in the clip and adapted for bearing contact with the joint between the temple and the lens frame when the former is extended to perpendicular position with reference to the latter.

In testimony whereof he affixes his signature.

FRED RADCLIFFE.